United States Patent
Fujiwara (10) Patent No.: US 7,697,398 B2
(45) Date of Patent: Apr. 13, 2010

(54) OPTICAL PICKUP DEVICE HAVING AN ELECTROMECHANICAL CONVERSION ELEMENT FOR RECORDING AND/ OR REPRODUCING INFORMATION

(75) Inventor: Katsumi Fujiwara, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 549 days.

(21) Appl. No.: 11/657,219

(22) Filed: Jan. 24, 2007

(65) Prior Publication Data
US 2007/0223324 A1   Sep. 27, 2007

(30) Foreign Application Priority Data
Jan. 27, 2006   (JP)   ............................. 2006-019419

(51) Int. Cl.
*G11B 7/00*   (2006.01)
(52) U.S. Cl. .............................. 369/112.23; 369/112.24
(58) Field of Classification Search ........................ None
See application file for complete search history.

(56) References Cited

U.S. PATENT DOCUMENTS
2006/0013109 A1 *   1/2006   Fujiwara et al. ........ 369/112.01

FOREIGN PATENT DOCUMENTS
JP   2005-302118   10/2005

* cited by examiner

*Primary Examiner*—Paul Huber
(74) *Attorney, Agent, or Firm*—Cohen Pontani Lieberman & Pavane LLP (57) ABSTRACT

A piezoelectric element of a driving device is arranged on the opposite side of the light source, when an optical pickup device is divided by a plane that includes an optical axis of an objective lens and perpendicularly intersects the axis line of a light flux entering a raising mirror, that has come from the light source, whereby, it is possible to cause optical elements existing between the objective lens and the laser light source to be away from the piezoelectric element, and thereby to avoid an influence of heat even when a gap between members is reduced.

12 Claims, 6 Drawing Sheets

OPTICAL PICKUP DEVICE HAVING AN ELECTROMECHANICAL CONVERSION ELEMENT FOR RECORDING AND/OR REPRODUCING INFORMATION

This application is based on Japanese Patent Application No. 2006-019419 filed on Jan. 27, 2006 in Japanese Patent Office, the entire content of which is hereby incorporated by reference.

BACKGROUND OF THE INVENTION

The present invention relates to an optical pickup device, and in particular, to an optical pickup device that is of a thin type and can conduct recording and/or reproducing of information properly for an optical information recording medium.

In recent years, research and development of high density optical disc system that can conduct recording and reproducing of information by using a blue-violet semiconductor laser having a wavelength of about 400 nm is advanced rapidly. As an example, in the case of an optical disc conducting recording and reproducing of information under the specifications of NA 0.85 and light source wavelength 405 nm, namely, in the case of the so-called Blu-ray Disc (BD), information in the amount of 20-30 GB can be recorded on a single face for an optical disc having a diameter of 12 cm that is the same in terms of size as DVD (NA 0.6, light source wavelength 650 nm, memory capacity 4.7 GB), and in the case of an optical disc conducting recording and reproducing of information under the specifications of NA 0.65 and light source wavelength 405 nm, namely, in the case of the so-called HD DVD, information in the amount of 15-20 GB can be recorded on a single face for an optical disc having a diameter of 12 cm. In the present specification, the optical disc of this kind is called "high density DVD" hereafter.

In the meantime, a value of an optical pickup device as a product is not sufficient if an ability of the optical pickup device is only conducting recording and reproducing of information properly for the high density DVD. When considering a reality at present that DVD and CD on which various pieces of information are recorded are on the market, only conducting recording and reproducing of information properly for high density DVD is not sufficient, an arrangement to be capable of conducting recording and reproducing of information properly in the same way also for conventional DVD or CD which has been owned by a user, for example, can enhance a value of an optical pickup device of a compatible type as a product. From the background of this kind, an optical system used for the optical pickup device of a compatible type is required to be of a low cost and to have a simple structure naturally, and to obtain an excellent spot for conducting recording and reproducing for information properly even for any of high density DVD, conventional DVD and CD. Though an optical pickup device capable of conducting recording and/or reproducing of information for DVD and CD on a compatible basis has been put into practical use, further downsizing, a thinner type and a low cost are demanded for the present structure of the optical pickup device. In particular, in the case of a notebook computer, there is an actual condition that a thinner type optical pickup device to be mounted on the notebook computer is desired eagerly, to enhance competitiveness of the product.

In Patent Document 1, there is disclosed an optical pickup device that conducts recording and/or reproducing of information under the state where the spherical aberration is corrected by moving a lens of a collimator optical system in the optical axis direction depending on an optical disc to be used to change an angle of divergence of a light flux passing through the lens. The lens of a collimator optical system of this kind is driven by a driving device that is relatively low in cost and is of a small-sized structure.

A piezoelctric element serving as a power source for an actuator shown in Patent Document 1 has characteristics that an amount of generated heat is small, when compared with other actuators. However, when an optical pickup device is constituted to be extremely thin, the piezoelctric element is occasionally arranged to be close to an optical element for the reason of a space. In such a case, there is a fear that the optical element is affected by heat generated from the piezoelctric element, especially when the optical element is made of resin.

(Patent Document 1) Unexamined Japanese Patent Application No. 2005-302118

SUMMARY

The present invention has been attained in view of the aforesaid problems, and its object is to provide an optical pickup device capable of conducting recording and/or reproducing of information properly, even when a thickness of the optical pickup device is made to be thin.

An optical pickup device relating to the invention is represented by an optical pickup device in which a light flux coming from a light source is caused to enter an objective lens through a movable optical element and a reflecting optical element, and light coming from the objective lens is converged on an information recording surface of an optical information recording medium in a different type to conduct recording and/or reproducing of information, and the optical pickup device includes a driving device equipped with an electromechanical conversion element that expands and contracts repeatedly by changing speeds between the expanding direction and contracting direction and with a movable portion connected with the movable optical element that moves in the prescribed direction in accordance with a pattern of expanding and contracting of the electromechanical conversion element, wherein the electromechanical conversion element is arranged on the opposite side of the light source when the optical pickup device is divided by a plane including an optical axis of the objective lens and being perpendicular to the axis line of a light flux entering the reflecting optical element.

DETAILED DESCRIPTION OF THE PREFERRED EMBODIMENT

Figure 1:
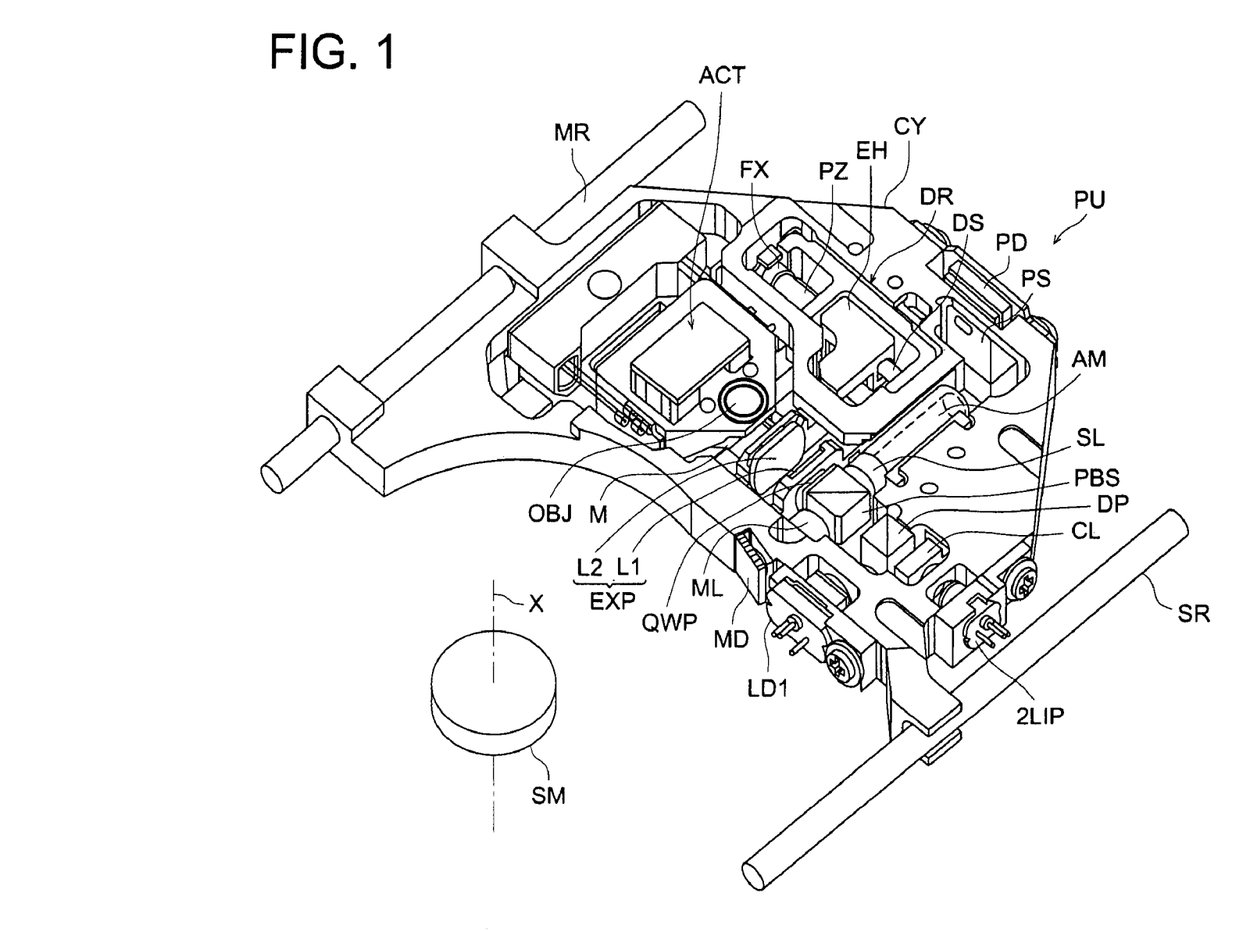
FIG. 1 is a perspective view of an optical pickup device relating to the present embodiment.

The invention will be explained in a more detailed way as follows, referring to the drawings. FIG. 1 is a perspective view of an optical pickup device relating to the present embodiment. In optical pickup device PU capable of conducting recording and reproducing of information properly for BD or HD DVD, DVD and CD which are optical information recording media each having a different thickness of a protective layer, there is provided carrier CY that is engaged with main rail MR and sub-rail SR both running in parallel, and is supported movably by an unillustrated actuator. The optical pickup device PU includes the first semiconductor laser LD1 capable of emitting a light flux with wavelength $\lambda 1$, 2-laser 1-package 2L1P which carries the second semiconductor laser capable of emitting a light flux with wavelength $\lambda 2$ and the third semiconductor laser capable of emitting a light flux with wavelength $\lambda 3$, coupling lens CL, dichroic prism DP, polarizing beam splitter PBS, quarter $\lambda$ wavelength plate QWP, monitor lens ML, monitor detector MD, expander lens EXP composed of lenses L1 and L2, raising mirror M representing a reflecting optical element, objective lens OBJ held by actuator ACT to be capable of being driven, servo-lens SL supported by cylindrical adjusting member AM, prism PS and photo-detector PD, which are mounted on the carrier CY.

Figure 2:
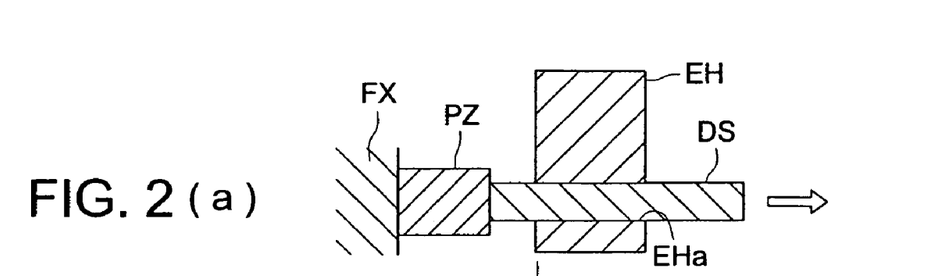
FIG. 2 is a schematic structural diagram of driving device DR of the present embodiment.

Lens L2 representing a movable optical element is moved for lens L1 fixed on carrier CY in its optical axis direction by driving device (which is also called driving measure) DR. FIG. 2 is a schematic structural diagram of driving device DR wherein an amount of strain of a piezoelectric element is shown to be more exaggerated than the truth. In FIG. 2, an end of one side (left end) of piezoelectric element PZ representing an electromechanical conversion element is fixed on carrier CY (FIG. 1) through fixing portion FX, and driving shaft (which is also called a driving section) DS is attached on the other end (right end) of the piezoelectric element. The driving shaft DS is inserted into opening EHa provided on holder (which is also called a movable portion) EH that holds lens L2, to be in contact with the opening at a certain level of frictional force.

Figure 3:
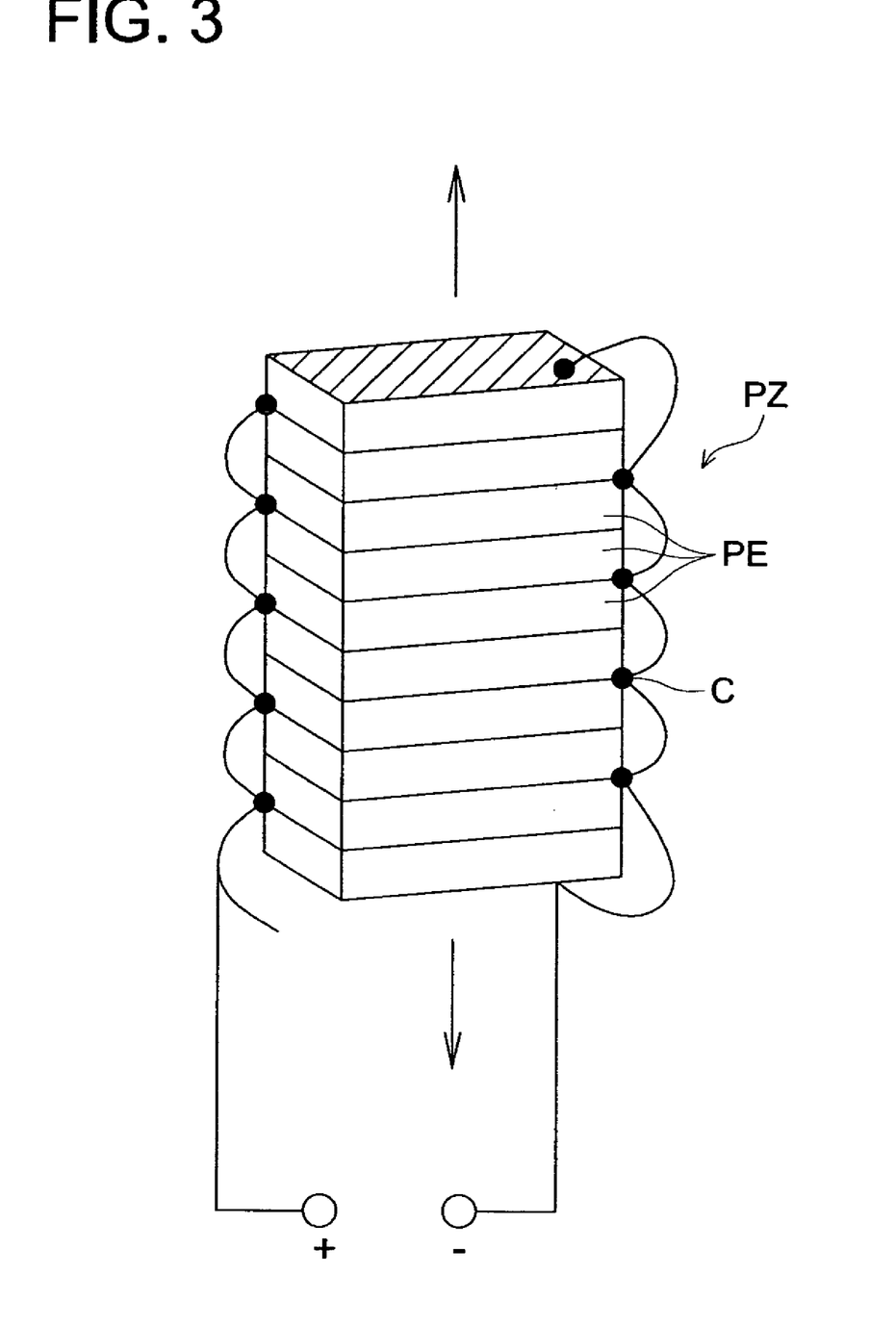
FIG. 3 is a perspective view showing laminated type piezoelectric actuator PZ having a structure in which a plurality of piezoelectric ceramics PE are laminated and electrodes C are connected between the piezoelectric ceramics in parallel.

The piezoelectric element PZ is composed of piezoelectric ceramics formed by PZT (zircon.lead titanate). In the crystal grating of the piezoelectric ceramics, the center of gravity of distribution for positive charges in its crystal grating does not agree with the center of gravity of distribution for negative charges, and it is polarized and has characteristics that it stretches when a voltage is applied to it in its polarization direction. However, the strain of the piezoelectric ceramics in the aforesaid direction is microscopic, and it is difficult to drive a member to be driven with this amount of strain. Therefore, as one that can be put to practical use, there is available laminated type piezoelectric element PZ having a structure in which a plurality of piezoelectric ceramics PE are laminated and electrodes C are connected with the piezoelectric ceramics between them in parallel, as shown in FIG. 3. In the present embodiment, this laminated type piezoelectric element PZ is used as a driving source.

Figure 4A:
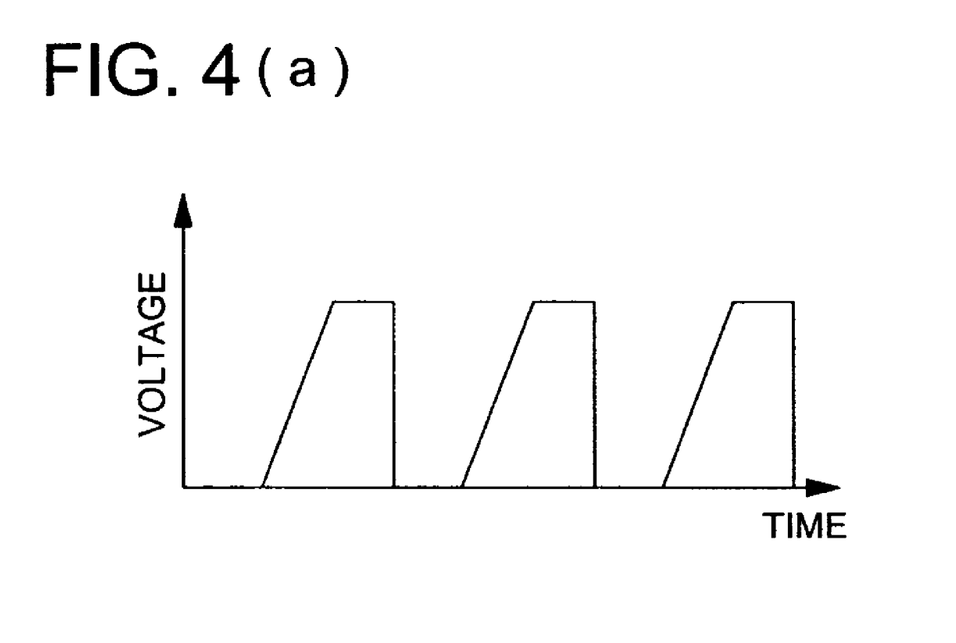
FIG. 4 is a diagram showing a wave form of a voltage pulse to be applied on piezoelectric actuator PZ.
Figure 4B:
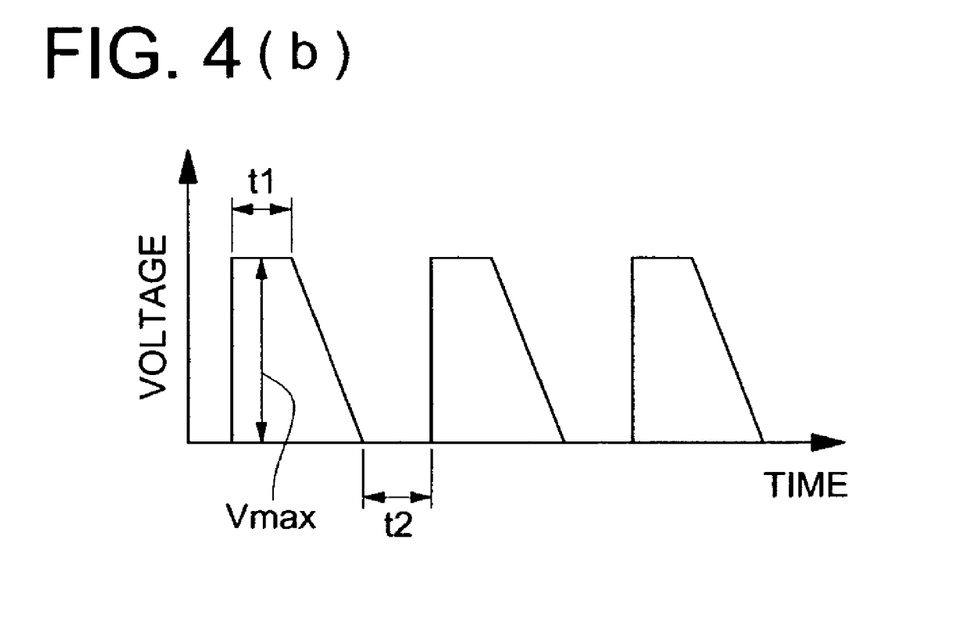

Next, how the driving device DR drives lens L2 will be explained. In general, laminated piezoelectric element PZ has great generation power and sharp response, although its amount of displacement is small in the case of applying voltage. Therefore, when applying a pulse voltage having a roughly indented waveform wherein rising is gentle and falling is sharp as shown in FIG. 4 (a), the piezoelectric element PZ shows an expansion and contraction pattern wherein it expands gently in the course of rising of the pulse and contracts more sharply than the foregoing in the course of falling of the pulse. Accordingly, if the piezoelectric element PZ expands gently from the state shown in FIG. 2 (a), lens L2 held by holder EH also moves in the optical axis direction (see FIG. 2 (b)), because the holder EH combined by friction force also moves together with a movement of driving shaft DS. However, if the piezoelectric element PZ contracts sharply, a relative movement between the driving shaft DS and the holder EH is caused by inertia of the holder EH, overcoming the friction force between the driving shaft DS and the holder EH, thus, the holder EH stays there keeping its position even when the driving shaft DS moves (see FIG. 2 (c)). Owing to this, it is possible to move the holder EH by distance $\Delta$, by giving one pulse to the piezoelectric element PZ to be driven by one stroke. Therefore, if the piezoelectric element PZ is driven by n strokes, lens L1 can be moved in the optical axis direction by distance $n \times \Delta$. Incidentally, if there is applied a pulse wherein rising is sharp and falling is gentle as shown in FIG. 4 (b), it is possible to move the holder EH and lens L2 in the opposite direction, because the piezoelectric element PZ has an opposite expansion and contraction pattern. As stated above, the driving device DR can drive lens L2 to any position by expanding and contracting the piezoelectric element PZ repeatedly by causing the speed in expanding to be different from that in contracting.

Figure 5:
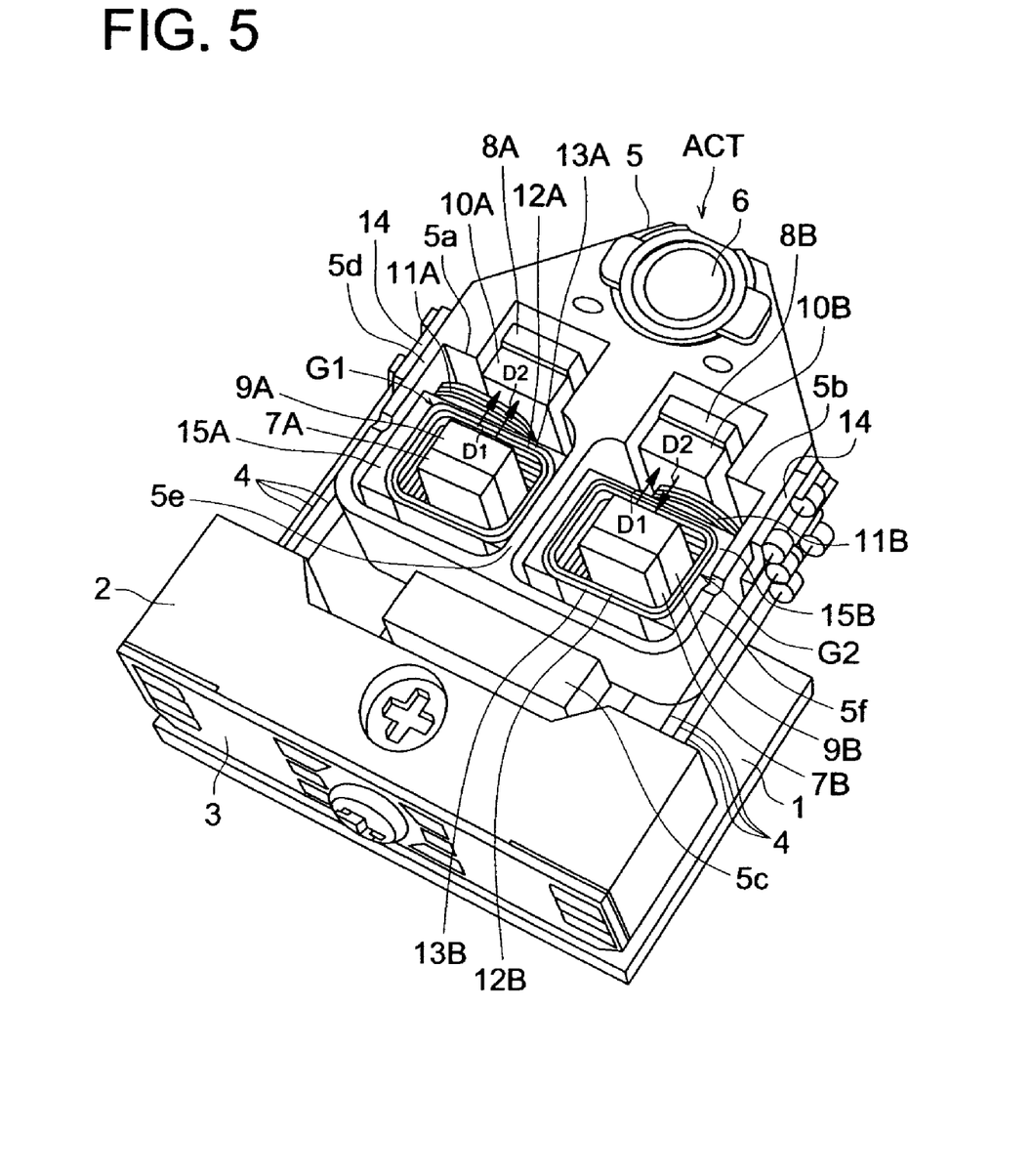
FIG. 5 is a perspective view of actuator ACT relating to the present embodiment.

FIG. 5 is a perspective view of actuator ACT relating to the present embodiment. Plate-shaped base 1 serving as a yoke is fixed on carrier CY of optical pickup device PU (FIG. 1). On the base 1, there is fixed casing 2. On the near side of casing 2 in FIG. 5, there is attached base board 3. On the base board 3, there is fixed one end of each of the total six wires 4 wherein three wires thereof are on one side of the base board, and wires 4 on each side are arranged to be in parallel at regular intervals in the vertical direction to be extending along base 1. The other ends of the wires 4 are soldered on the side of holder 5 through holder base board 14. Wires 4 have a function to support the holder 5 movably against the base 1 and a function to supply electric power to a coil described later from the base board 3 to which an unillustrated wire is to be connected. In the meantime, the casing 2 is filled with gel (not shown) having a damping effect for the wires 4.

The holder 5 made of resin has a shape of a plate that is substantially pentagonal, and objective lens 6 is mounted in a circular opening (not shown) on the far side of FIG. 5. This objective lens 6 is used to converge a laser light flux on an information recording surface of an optical disc in an optical pickup device. Further, holder 5 forms two rectangular openings 5a and 5b on the near side of FIG. 5, and it further has balancer 5c adjoining the rectangular openings 5a and 5b. Meanwhile, the holder 5 connects between the objective lens 6 side and its opposite side with columnar portions 5d and 5e arranged on both sides of the rectangular opening 5a, which can also be said to be connected with columnar portions 5e and 5f arranged on both sides of the rectangular opening 5b. Because of such structure, stiffness of the holder 5 can be secured to be high even when an area of the cross section of each of rectangular openings 5a and 5b is secured to be relatively large. Further, if a central axis line of center common columnar portion 5e (including its extended line) intersects an optical axis of objective lens 6, excellent balance of the holder 5 can be obtained.

A pair of magnets 9A and 10A each being backed with each of yokes 7A and 8A are arranged, in rectangular opening 5a, to face each other in a way that the direction of a magnetic field between the magnets may be in parallel with arrow D1. First coil group G1 (inside coil 12A and outside coil 13A) is arranged so that it may coil round surroundings of magnet 9A and yoke 7A. Between the first coil group G1 and the magnet 10A, there is arranged tracking coil 11A that is coiled so that the axis of tracking coil 11A and the axis of the first coil group G1 may cross at right angles.

On the other hand, a pair of magnets 9B and 10B each being backed with each of yokes 7B and 8B are arranged, in rectangular opening 5b, to face each other in a way that the direction of a magnetic field between the magnets may be in parallel with arrow D1. Second coil group G2 (inside coil 12B and outside coil 13B) is arranged so that it may coil round surroundings of magnet 9B and yoke 7B. Between the second coil group G2 and the magnet 10B, there is arranged tracking coil 11B that is coiled so that the axis of tracking coil 11B and the axis of the second coil group G2 may cross at right angles. The first coil group G1 is attached on rectangular opening 5a through holding body 15A that holds both sides of the first coil group, and the second coil group G2 is attached on rectangular opening 5b through holding body 15B that holds both sides of the second coil group. The abovementioned coil groups constitute an actuator driving section for driving actuator ACT.

In FIG. 1, piezoelectric element PZ of driving device DR is arranged on the opposite side of light source, when optical pickup device PU is divided by a plane that includes an optical axis of objective lens OBJ and intersects the axis line of a light flux entering raising mirror M, which has come from the light source, at right angles. Further, the piezoelectric element PZ is arranged on the opposite side of rotation axis line X of an optical disc, when optical pickup device PU is divided by a plane that includes an optical axis of objective lens OBJ and an axis line of a light flux entering raising mirror M, which has come from the light source. A thickness of the optical pickup device PU (thickness in the direction parallel to the rotation axis line X) is not more than 10 mm.

When conducting recording and/or reproducing of information for an unillustrated first optical disc (for example, BD or HD DVD), in the optical pickup in FIG. 1, a light flux emitted from semiconductor laser LD1 (first light source) with wavelength 350-450 nm is reflected on dichroic prism DP, then, passes through polarizing beam splitter PBS and passes through quarter λ wavelength plate QWP, and then, passes through lens L1 of expander lens EXP and through lens L2 moved to the first position by driving device DR to be converted into a substantially parallel light flux, and enters the raising mirror M. Meanwhile, a part of the light flux reflected on the polarizing beam splitter PBS passes through monitor lens ML and enters monitor detector MD to be used for monitoring of laser power.

The light flux that has entered the raising mirror M is reflected thereon to enter objective lens OBJ, and is converged therefrom on an information recording surface of the first optical disc (thickness of a protective layer is 0.1 mm or 0.6 mm).

A reflected light flux modulated by information pits on the information recording surface passes again through objective lens OBJ, and after being reflected on the raising mirror M, it passes through lenses L2 and L1 of expander lens EXP, and passes through quarter λ wavelength plate QWP to be reflected on polarizing beam splitter PBS, and passes through servo-lens SL and an inside of adjusting member AM to be reflected inside prism PS, and is converged on a light receiving surface of optical detector PD. Reading signals for information recorded on the first optical disc are obtained by using output signals of this photodetector PD.

Further, there are conducted focusing detection and track detection by detecting changes in light amount caused by changes in forms and positions of the spot on photodetector PD. Based on these detections, actuator ACT conducts operations of focusing actuation, tracking actuation and tilt adjustment for the objective lens.

Specific operations of actuator ACT will be explained. In FIG. 5, when power is supplied through wire 4, electricity runs through outside coils 13A and 13B at the same value of electric current and in the same direction (clockwise in this case). Under the Fleming's left-hand rule, upward magnetic force in the diagram is generated on the outside coil 13A and upward magnetic force in the diagram is generated on the outside coil 13B, because the direction of the magnetic field is the same as that of arrow D1. Therefore, the holder 5 wherein the first coil group G1 and the second coil group G2 are fixed is moved upward in the diagram, and thereby, the objective lens 6 is moved in the optical axis direction, which realizes focusing operations. Incidentally, if the direction of the electric current is reversed, the holder 5 is moved downward.

On the other hand, if electricity is made to run clockwise through inside coil 12A and if electricity is made to run counterclockwise through inside coil 12B, upward magnetic force in the diagram is generated on the inside coil 12A, and downward magnetic force in the diagram is generated on the inside coil 12B, under the Fleming's left-hand rule. Therefore, the moment acts on the holder 5 around its center axis line. It is possible to conduct tilt adjustment for objective lens 6 by tilting the holder 5 by using this moment. Further, it is also possible to employ the structure of the magnetic circuit wherein directions of electric currents respectively in inside coils 12A and 12B are made the same to be clockwise direction, and directions of electric currents respectively in outside coils 13A and 13B are made to be different each other, by making the direction of the magnetic field between magnets to be arrow D2.

Further, by causing electricity to run through tracking coils 11A and 11B, the holder 5 can be moved together with objective lens 6 in the direction perpendicular to the optical axis, which makes it possible to conduct tracking operations.

Depending on fluctuations of a thickness of a protective layer of the first optical disc, or in the case of shifting between layers in conducting recording and/or reproducing of information for a multi-layer disc, by making fine adjustment of a position of lens L2 by means of driving device DR it is possible to correct spherical aberration of a light-convergence spot on an information recording surface, resulting in possibility of conducting better recording and/or reproducing of information.

When conducting recording and/or reproducing of information for an unillustrated second optical disc (for example, DVD), a light flux emitted from a semiconductor laser (second light source) with wavelength 600-700 nm in optical pickup device PU in FIG. 1 is emitted from 2-laser 1-package 2L1P and passes through coupling lens CL to be changed in terms of an angle of divergence, and passes through dichroic prism DP and polarizing beam splitter PBS, then, passes through quarter λ wavelength plate QWP and lens L1 of expander lens EXP, and passes through lens L2 moved by driving device DR to the second position to be converged into a substantially parallel light flux, and enters raising mirror M. Incidentally, a part of the light flux reflected on the polarizing beam splitter PBS passes through monitor lens ML and enters monitor detector MD to be used for monitoring of laser power.

The light flux that has entered the raising mirror M is reflected thereon to enter objective lens OBJ, and is converged therefrom on an information recording surface of the second optical disc (thickness of a protective layer is 0.6 mm).

A reflected light flux modulated by information pits on the information recording surface passes again through objective lens OBJ, and after being reflected on the raising mirror M, it passes through lenses L2 and L1 of expander lens EXP, and passes through quarter λ wavelength plate QWP to be reflected on polarizing beam splitter PBS, and passes through servo-lens SL and an inside of adjusting member AM to be reflected inside prism PS, and is converged on a light receiving surface of optical detector PD. Reading signals for information recorded on the second optical disc are obtained by using output signals of this photodetector PD.

Further, there are conducted focusing detection and track detection by detecting changes in light amount caused by changes in forms and positions of the spot on photodetector PD. Based on these detections, actuator ACT conducts operations of focusing actuation, tracking actuation and tilt adjustment for the objective lens.

Depending on fluctuations of a thickness of a protective layer of the second optical disc, or in the case of shifting between layers in conducting recording and/or reproducing of information for a multi-layer disc, by making fine adjustment of a position of lens L2 by means of driving device DR, it is possible to correct spherical aberration of a light-convergence spot on an information recording surface, resulting in possibility of conducting better recording and/or reproducing of information. By means of this, for example, for the difference of light source wavelength between for the first optical disc and for the second optical disc, the spherical aberration can be corrected.

When conducting recording and/or reproducing of information for an unillustrated third optical disc (for example, CD), a light flux emitted from a semiconductor laser (third light source) with wavelength 700-800 nm in optical pickup device PU in FIG. 1 is emitted from 2-laser 1-package 2L1P and passes through coupling lens CL to be changed in terms of an angle of divergence, and passes through dichroic prism DP and polarizing beam splitter PBS, then, passes through quarter λ wavelength plate QWP and lens L1 of expander lens EXP, and passes through lens L2 moved by driving device DR to the third position to be converged into a finite divergence light flux, and enters raising mirror M. Incidentally, a part of the light flux reflected on the polarizing beam splitter PBS passes through monitor lens ML and enters monitor detector MD to be used for monitoring of laser power.

The light flux that has entered the raising mirror M is reflected thereon to enter objective lens OBJ, and is converged therefrom on an information recording surface of the third optical disc (thickness of a protective layer is 1.2 mm).

A reflected light flux modulated by information pits on the information recording surface passes again through objective lens OBJ, and after being reflected on the raising mirror M, it passes through lenses L2 and L1 of expander lens EXP, and passes through quarter λ wavelength plate QWP to be reflected on polarizing beam splitter PBS, and passes through servo-lens SL and an inside of adjusting member AM to be reflected inside prism PS, and is converged on a light receiving surface of optical detector PD. Reading signals for information recorded on the third optical disc are obtained by using output signals of this photodetector PD.

Further, there are conducted focusing detection and track detection by detecting changes in light amount caused by changes in forms and positions of the spot on photodetector PD. Based on these detections, actuator ACT conducts operations of focusing actuation, tracking actuation and tilt adjustment for the objective lens.

In the present embodiment, piezoelectric element PZ of driving device DR is arranged on the opposite side of the light source, when optical pickup device PU is divided by a plane that includes an optical axis of objective lens OBJ and intersects the axis line of a light flux entering raising mirror M, which has come from the light source, at right angles. Therefore, it is possible to cause an optical element existing between objective lens OBJ and laser light source LD1 or between objective lens OBJ and 2L1P to be away from piezoelectric element PZ, and thereby to avoid an influence of heat even when a gap between members is reduced. Further, the piezoelectric element PZ is arranged on the opposite side of rotation axis line X of an optical disc, when optical pickup device PU is divided by a plane that includes an optical axis of objective lens OBJ and an axis line of a light flux entering raising mirror M, which has come from the light source. Therefore, it is possible to avoid interference with spindle motor SM that rotates an optical disc, and to broaden an accessible range toward the center of rotary axis for an optical disc in an optical pickup device.

Figure 6:
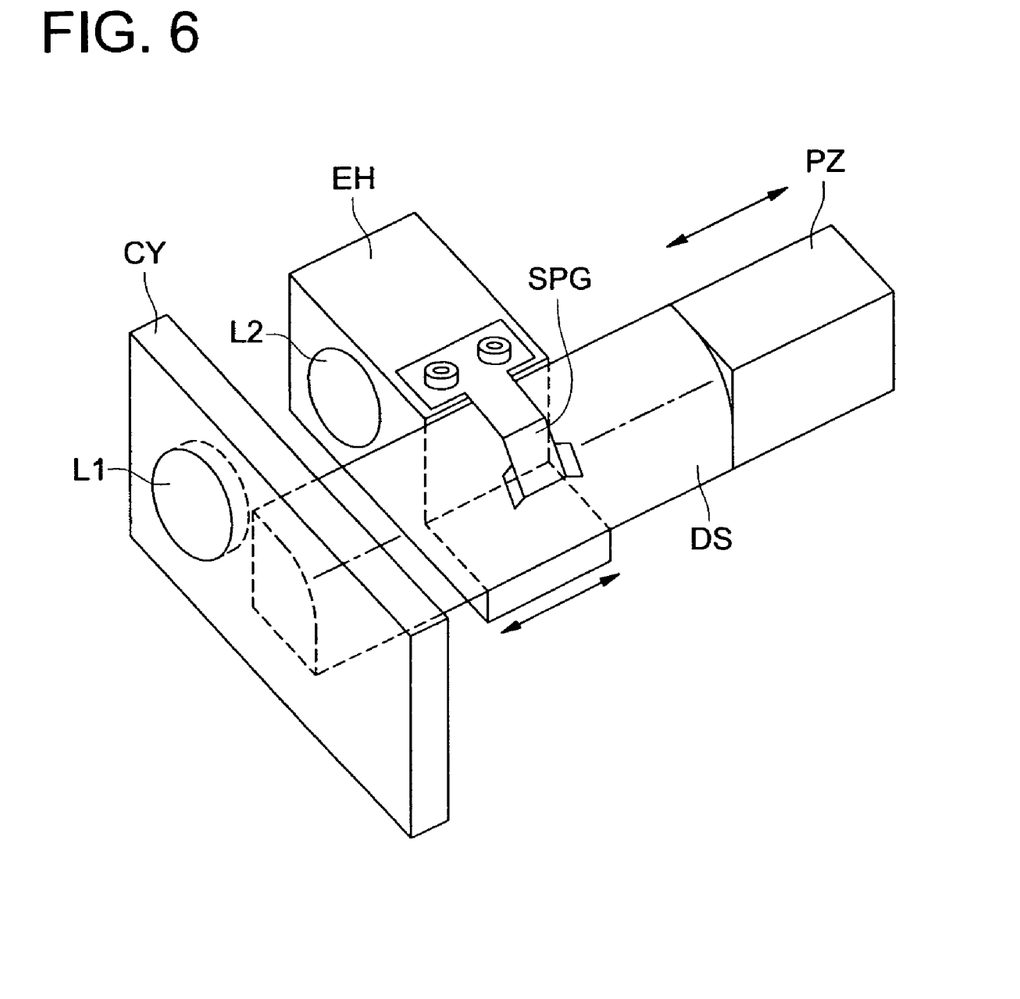
FIG. 6 is a schematic structural diagram of driving device DR relating to a variation.

FIG. 6 is a diagram showing a variation of driving device DR. In the driving device DR in FIG. 6, lens L1 is fixed on one end of driving shaft DS through carrier CY. On the other hand, on the other end of the driving shaft DS, there is fixed piezoelectric element PZ representing an electromechanical conversion element. The piezoelectric element PZ is fixed only on driving shaft DS representing a driving section. On L-shaped holder EH on which lens L2 is attached, there is attached leaf spring SPG which urges an outer circumference of driving shaft DS toward the holder EH. Even in the present embodiment, it is possible to move the holder EH in the direction of axis line by an any amount, by applying pulse-shaped voltage shown in FIG. 4. Incidentally, with respect to the driving device of this kind, it is disclosed in detail in Unexamined Japanese Patent Application Nos. 2002-95274, 2002-300789, 2002-300790 and 2003-33053.

Though the invention has been explained, referring to the embodiments, the invention should not be construed to be limited to the aforesaid embodiments, and it is naturally possible to modify and improve properly.

In the optical pickup device of the present embodiment, the aforesaid electromechanical conversion element is arranged on the opposite side of the light source when the optical pickup device is divided by the plane including an optical axis of the objective lens and perpendicularly intersecting the axis line of a light flux, entering the aforesaid reflecting optical element, that has come from the light source. Therefore, even when the optical pickup device of this kind is designed to be thin, the electromechanical conversion element can be arranged to be away from the greater part of optical elements used in the optical pickup device, so that an influence of heat on optical elements can be controlled to be small.

With respect to another embodiment, in the aforesaid embodiment, the aforesaid electromechanical conversion element is arranged on the opposite side of rotation axis line of the optical information recording medium, when the optical pickup device is divided by a plane that includes an optical axis of the objective lens and an axis line of a light flux entering the reflecting optical element, that has come from the light source. Therefore, it is possible to avoid interference between the spindle motor that rotates the optical information recording medium and the electromechanical conversion element, and to broaden an accessible range toward the center of rotary axis for an optical information recording medium in an optical pickup device.

The optical pickup device in still another embodiment is characterized to have a thickness of 10 mm or less in the aforesaid embodiment, which makes it possible to exhibit the effect of the invention more effectively.

The present invention makes it possible to provide an optical pickup device capable of conducting recording and/or reproducing of information properly even when its thickness is reduced.

What is claimed is:

1. An optical pickup device comprising:
   a light source;
   a reflective optical element;
   an objective lens;
   an electromechanical conversion element which repeatedly expands and contracts with different velocities between an expansion direction and a contraction direction;
   a driving device including a movable portion which moves in a predetermined direction according to a pattern of expansion and contraction of the electromechanical conversion element; and
   a movable optical element connected with the movable portion;
   wherein the optical pickup device conducts at least one of recording and reproduction of information by entering a light flux coming from the light source into the objective lens through the movable optical element and the reflective optical element and by focusing the light flux coming from the objective lens onto each information recording surface of various types of optical information recording media, and
   wherein when the optical pickup device is divided by a first plane which includes an optical axis of the objective lens and which is perpendicular to an axis of an incident light flux of the light flux coming from the light source, the incident light flux entering the reflective optical element, the electromechanical conversion element is positioned on an opposite side of the first plane with respect to the light source.

2. The optical pickup device of claim 1, wherein when the optical pickup device is divided by a second plane which includes an optical axis of the objective lens and the axis of the incident light flux of the light flux coming from the light source, the incident light flux entering the reflective optical element, the electromechanical conversion element is positioned on an opposite side of the second plane with respect to a rotational axis of an optical information recording medium.

3. The optical pickup device of claim 1, wherein a thickness of the optical pickup device in a direction parallel to a rotational axis of an optical recording medium is 10 mm or less.

4. The optical pickup device of claim 1, wherein the electromechanical conversion element comprises a piezoelectric element.

5. The optical pickup device of claim 1, further comprising:
   an actuator driving section for moving the objective lens at least in an optical axis direction,
   wherein when the optical pickup device is divided by the first plane which includes the optical axis of the objective lens and which is perpendicular to axis of incident light flux of the light flux coming from the light source, the incident light flux entering the reflective optical element, the actuator driving section is positioned on an opposite side of the first plane with respect to the light source.

6. The optical pickup device of claim 1, wherein the optical pickup device changes an angle of divergence of a light flux entering the object lens by moving the movable optical element so as to correct a spherical aberration caused by variation of a protective layer thickness of the optical information recording media when the optical pickup device conducts said at least one of recording and reproduction of the information for the optical information recording media.

7. The optical pickup device of claim 1, wherein the optical pickup device changes an angle of divergence of the light flux entering the object lens by moving the movable optical element so as to correct a spherical aberration caused by shifting between layers when the optical pickup device conducts at least one of recording and reproduction of information for a multi-layer optical information recording medium.

8. The optical pickup device of claim 1, wherein the optical pickup device changes an angle of divergence of the light flux entering the object lens by moving the movable optical element so as to correct a spherical aberration caused by variation of light source wavelengths when the optical pickup device conducts at least one of recording and reproduction of information for each of a plurality of optical information recording media for which different light source wavelengths are used.

9. The optical pickup device of claim 8, wherein a wavelength of one of said light source wavelengths is $\lambda 1$, and $350 \text{ nm} \leq \lambda 1 \leq 450 \text{ nm}$.

10. The optical pickup device of claim 8, wherein a wavelength of one of said light source wavelengths is $\lambda 2$, and $600 \text{ nm} \leq \lambda 2 \leq 700 \text{ nm}$.

11. The optical pickup device of claim 8, wherein a wavelength of one of said light source wavelengths is $\lambda 3$, and $700 \text{ nm} \leq \lambda 3 \leq 800 \text{ nm}$.

12. The optical pickup device of claim 1, wherein the movable optical element comprises one of a lens and a lens group comprising an expander lens for enlarging a light flux diameter of entering parallel light so as to change an angle of divergence of a light flux emitted from the expander lens by moving the one of the lens and the lens group.

* * * * *